US012574375B2

(12) United States Patent　　　(10) Patent No.:　US 12,574,375 B2
Cosky　　　　　　　　　　　　　(45) Date of Patent:　　Mar. 10, 2026

(54) CLOUD VIRTUAL REALITY ECOSYSTEM

(71) Applicant: Meta Platforms Technologies, LLC,
　　　　　　　Menlo Park, CA (US)

(72) Inventor: Eric Harvard Cosky, Redwood City,
　　　　　　　CA (US)

(73) Assignee: Meta Platforms Technologies, LLC,
　　　　　　　Menlo Park, CA (US)

( * ) Notice:　Subject to any disclaimer, the term of this
　　　　　　　patent is extended or adjusted under 35
　　　　　　　U.S.C. 154(b) by 153 days.

(21) Appl. No.: 18/400,596

(22) Filed:　　Dec. 29, 2023

(65)　　　　　Prior Publication Data

US 2024/0223562 A1　　Jul. 4, 2024

Related U.S. Application Data

(60) Provisional application No. 63/436,423, filed on Dec.
　　 30, 2022.

(51) Int. Cl.
　　 *H04L 9/40*　　　　　(2022.01)
(52) U.S. Cl.
　　 CPC ........... *H04L 63/10* (2013.01); *H04L 63/102*
　　　　　　　　(2013.01); *H04L 63/104* (2013.01)
(58) Field of Classification Search
　　 CPC ..... H04L 63/10; H04L 63/101; H04L 63/104;
　　　　　　H04L 63/102; H04L 63/108; H04L 63/17;
　　　　　　　　　　　　　　　　　　　H04L 63/123
　　 See application file for complete search history.

(56)　　　　　References Cited

U.S. PATENT DOCUMENTS

| 8,688,975 B2 | 4/2014 | Hamilton, II et al. |
| 8,910,278 B2 | 12/2014 | Davne et al. |
| 8,974,308 B2 | 3/2015 | Boss et al. |
| 9,227,139 B2 | 1/2016 | Mamtani et al. |
| 10,806,997 B2 * | 10/2020 | Winick ...................... G06F 8/30 |
| 11,272,261 B2 | 3/2022 | Kim et al. |
| 11,856,044 B1 * | 12/2023 | Sohani .................. H04L 65/752 |
| 2011/0277027 A1 * | 11/2011 | Hayton ................. G06F 21/554 |
| | | 726/8 |
| 2016/0012465 A1 * | 1/2016 | Sharp ................... G06Q 20/321 |
| | | 705/14.17 |

(Continued)

FOREIGN PATENT DOCUMENTS

| AU | 2006240157 A1 * | 11/2006 | ............. A63F 13/71 |
| AU | 2014363926 A1 * | 8/2015 | ......... H04L 63/0428 |

(Continued)

*Primary Examiner* — Khanh Q Dinh
(74) *Attorney, Agent, or Firm* — Potomac Law Group,
PLLC; Dannon G. Allbee

(57)　　　　　　ABSTRACT
A method for virtual reality cloud computing includes
receiving, from a client device, a request by a user of the
client device to execute a application, the application being
provided by a third-party cloud service comprising a plu-
rality of hosts. The method further includes selecting, from
the plurality of hosts, a particular host to service the request,
and receiving, from the particular host, connection param-
eters that are required for establishing a streaming connec-
tion to the particular host. The method further includes, in
response to the request, providing the connection parameters
to a streaming client executing on the client device, and
instructing the streaming client to establish the streaming
connection to the particular host and to execute the appli-
cation.

18 Claims, 11 Drawing Sheets

(56)     References Cited

U.S. PATENT DOCUMENTS

| | | | |
|---|---|---|---|
| 2017/0093700 A1* | 3/2017 | Gilley | H04L 69/08 |
| 2020/0228524 A1 | 7/2020 | Szafranski et al. | |
| 2022/0060560 A1 | 2/2022 | Zhang | |
| 2022/0215370 A1* | 7/2022 | Yucra Rodriguez | G06Q 20/401 |
| 2022/0350809 A1* | 11/2022 | Bradley | G06F 16/2272 |
| 2023/0101274 A1* | 3/2023 | Lee | G09G 3/3233 |
| | | | 345/211 |
| 2023/0138423 A1* | 5/2023 | Wurmfeld | G06F 16/90335 |
| | | | 707/724 |
| 2023/0145127 A1* | 5/2023 | Barnum | G06Q 20/40145 |
| | | | 726/4 |
| 2023/0146678 A1* | 5/2023 | Barnum | G06Q 20/4012 |
| | | | 726/17 |
| 2023/0152598 A1* | 5/2023 | Brebner | G02B 27/0977 |
| | | | 359/627 |
| 2023/0232409 A1* | 7/2023 | Saber | H04W 72/23 |
| | | | 370/329 |
| 2023/0401274 A1* | 12/2023 | Denninghoff | G06Q 30/0251 |
| 2024/0144308 A1* | 5/2024 | Henson | G06Q 30/0206 |

FOREIGN PATENT DOCUMENTS

| | | | | |
|---|---|---|---|---|
| AU | 2015227464 A1 * | 10/2015 | | |
| CA | 3227877 A1 * | 3/2023 | | H04L 9/50 |

* cited by examiner

700

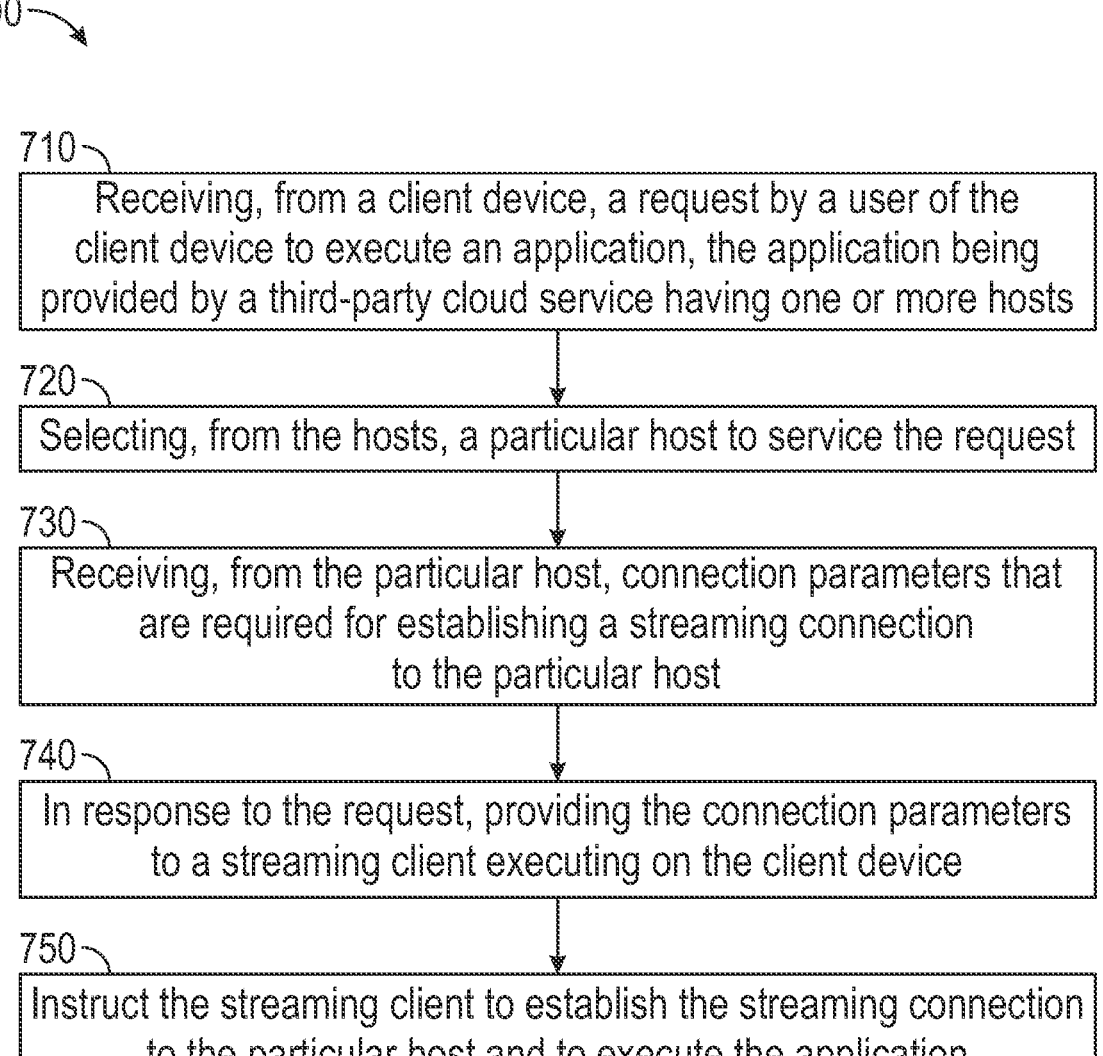

710

Receiving, from a client device, a request by a user of the client device to execute an application, the application being provided by a third-party cloud service having one or more hosts

720

Selecting, from the hosts, a particular host to service the request

730

Receiving, from the particular host, connection parameters that are required for establishing a streaming connection to the particular host

740

In response to the request, providing the connection parameters to a streaming client executing on the client device

750

Instruct the streaming client to establish the streaming connection to the particular host and to execute the application

FIG. 7

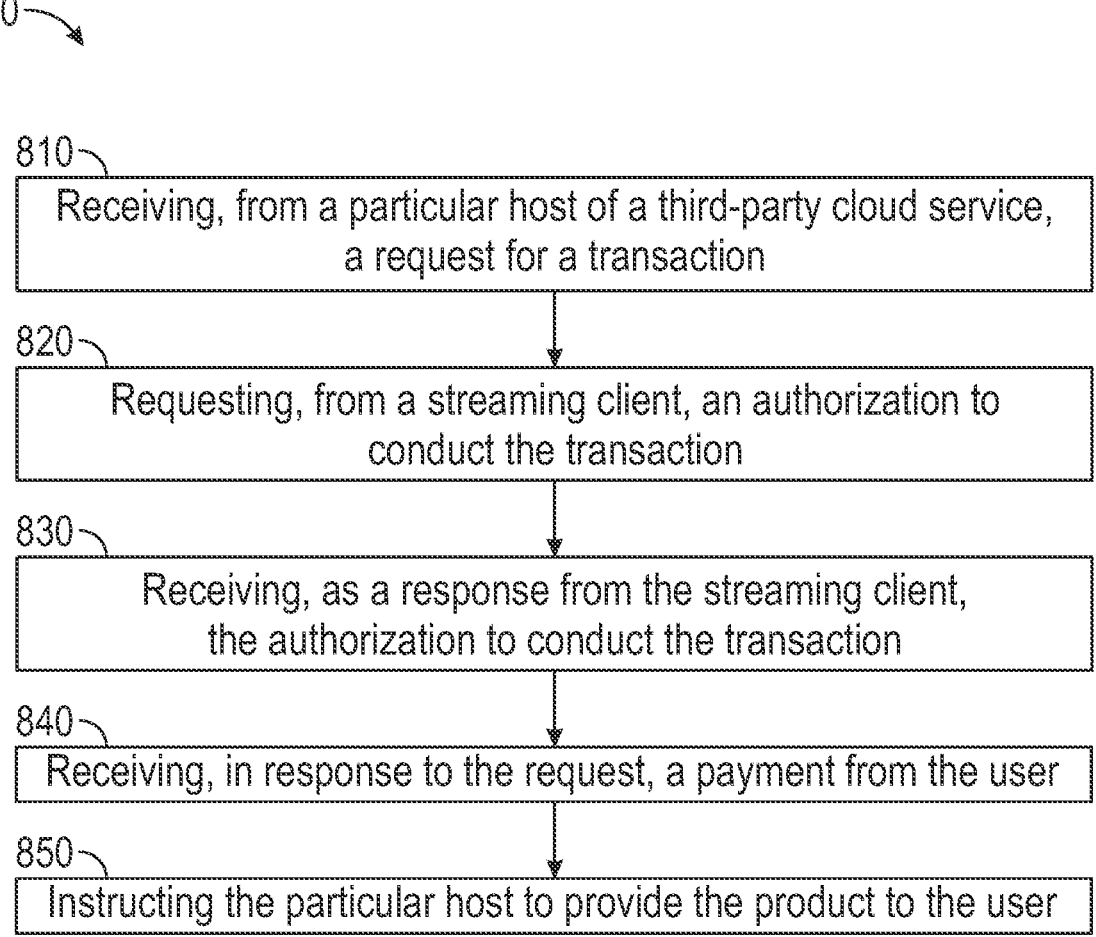

800

810
Receiving, from a particular host of a third-party cloud service,
a request for a transaction 820
Requesting, from a streaming client, an authorization to
conduct the transaction 830
Receiving, as a response from the streaming client,
the authorization to conduct the transaction 840
Receiving, in response to the request, a payment from the user 850
Instructing the particular host to provide the product to the user

FIG. 8

CLOUD VIRTUAL REALITY ECOSYSTEM

CROSS-REFERENCE OF RELATED APPLICATION

This application claims the benefit of U.S. Provisional Application No. 63/436,423, filed on Dec. 30, 2022, which is incorporated herein in its entirety.

TECHNICAL FIELD

The present disclosure generally relates to virtual reality, and more particularly to a cloud virtual reality ecosystem.

BACKGROUND

Virtual reality (VR) is a three-dimensional (3D) computer-generated environment with which a user can interact. A user's presence in the virtual environment is typically simulated by means of a headset that generates sights and sounds. Example applications for VR include video gaming, medical training, retail shopping, and interior designing. Typically, VR computer code is rendered locally on a VR headset. However, this approach requires locally installed powerful graphical hardware and computing resources.

Virtual reality (VR) may work with cloud computing platforms. However, there are cost, latency, and other resource constraints that pose serious challenges to any virtual reality (VR) provider considering hosting every instance of a cloud VR application running on the local hardware (e.g., headset) of the VR provider. Moreover, there are significant challenges related to hosting cloud VR applications (e.g., private hosting, data protection, and revenue models), such challenges can delay or even prevent the availability of cloud VR to users.

Data protection requirements compel VR providers to host cloud VR on their own hardware. It is a common for a VR provider to assume they must host everything for cloud VR to protect user data and secure the revenue stream of the VR provider. The VR provider may reason that they cannot protect data if they are not hosting everything.

As such, there is a need for offloading demanding computational tasks from headsets and other client devices, while protecting user data and the VR provider's revenue stream.

BRIEF SUMMARY

According to some embodiments, a method for virtual reality cloud computing includes receiving, from a client device, a request by a user of the client device to execute a application, the application being provided by a third-party cloud service having one or more hosts. The method further includes selecting, from the hosts, a particular host to service the request, and receiving, from the particular host, connection parameters that are required for establishing a streaming connection to the particular host. The method further includes, in response to the request, providing the connection parameters to a streaming client executing on the client device, and instructing the streaming client to establish the streaming connection to the particular host and to execute the application.

According to some embodiments, a non-transitory computer-readable medium stores a program for virtual reality cloud computing, which when executed by a computer, configures the computer to receive, from a client device, a first request by a user of the client device to execute an application, the application being provided by a third-party cloud service comprising one or more hosts. The executed program further configures the computer to select, from the hosts, a particular host to service the first request, and receive, from the particular host, connection parameters that are required for establishing a streaming connection to the particular host. The executed program further configures the computer to, in response to the first request, provide the connection parameters to a streaming client executing on the client device, and instruct the streaming client to establish the streaming connection to the particular host and to execute the application.

According to some embodiments, a system for virtual reality cloud computing includes a processor and a non-transitory computer readable medium storing a set of instructions, which when executed by the processor, configure the processor to receive, from a client device, a first request by a user of the client device to execute an application, the application being provided by a third-party cloud service comprising one or more hosts. The executed instructions further configure the processor to select, from the hosts, a particular host to service the first request, and to receive, from the particular host, connection parameters that are required for establishing a streaming connection to the particular host. The executed instructions further configure the processor to, in response to the first request, provide the connection parameters to a streaming client executing on the client device, and to instruct the streaming client to establish the streaming connection to the particular host and to execute the application. The executed instructions further configure the processor to receive, from the particular host, a second request for a transaction of a payment in exchange for a product, and to request, from the streaming client, an authorization to conduct the transaction. The executed instructions further configure the processor to receive, as a response from the streaming client, the authorization to conduct the transaction, and in response to the second request, receive the payment from the user. The executed instructions further configure the processor to, in further response to the second request, instruct the particular host to provide the product to the user.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 7 is a flowchart illustrating a process for virtual reality cloud computing performed by a first-party VR platform service, according to some embodiments.

FIG. 8 is a flowchart illustrating a process performed by a first-party VR platform service for processing in-application transactions, according to some embodiments.

Figure 1:
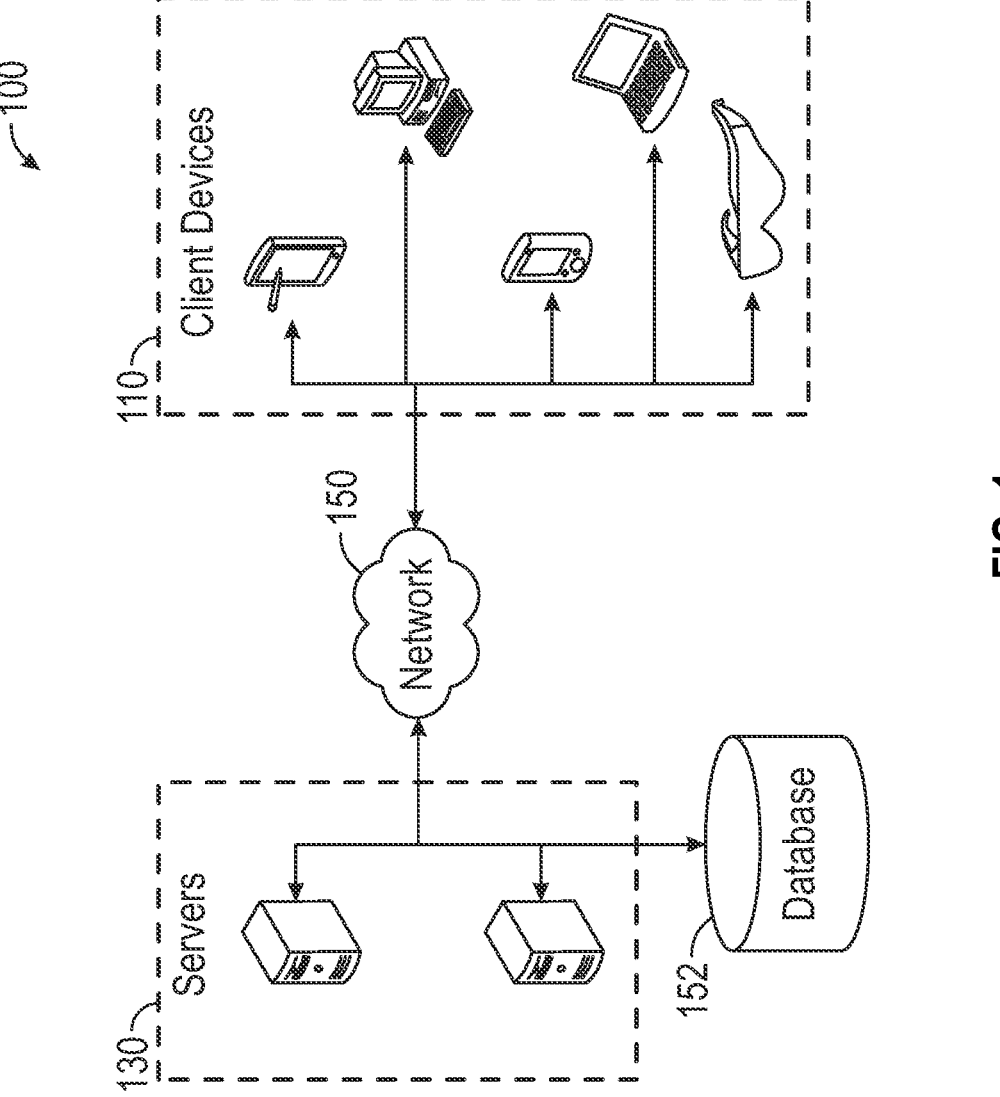
FIG. 1 illustrates a network architecture used to implement a cloud VR ecosystem, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The term "metaverse" as used herein refers, according to some embodiments, to a collective shared space in virtual reality, typically comprised of one or more interconnected digital environments, assets, and experiences. A metaverse may be a multifaceted, immersive platform that facilitates real-time interaction, collaboration, and engagement among its users. The metaverse may encompasses a vast array of digital spaces, ranging from simulated worlds and games to social hubs and commerce platforms. Within the metaverse, users and other entities (e.g., businesses, agencies, etc.) may create, own, and exchange digital assets, explore, socialize, conduct business, and participate in various activities within a seamless and dynamic virtual environment.

The term "virtual reality" as used herein refers, according to some embodiments, to a computer-generated simulation of an immersive, two-dimensional or (more typically) three-dimensional environment that can be explored and interacted with by individuals through sensory stimuli, typically employing headsets or other specialized devices. Virtual reality (abbreviated as "VR") may provide a sensory-rich experience that simulates and/or replicates the real world or an imagined setting, enabling users to engage in activities, manipulate objects, and perceive a simulated environment as if it were real. VR systems often encompass visual, auditory, and/or haptic feedback to enhance the sense of presence and immersion, transporting users into a digitally generated world where they can interact, learn, or experience various scenarios in a highly immersive and interactive manner. As used herein, the term "virtual reality" is understood to include the Internet and "augmented reality."

The term "cloud computing" as used herein refers, according to some embodiments, to a technology paradigm that enables access to a shared pool of configurable computing resources, such as networks, servers, storage, applications, and services, provided by a cloud services provider over a wide-area network such as the Internet. The cloud computing model provides on-demand availability and convenient access to these resources without requiring direct management of infrastructure. Users can swiftly deploy and scale applications, utilizing the cloud provider's vast and flexible infrastructure as needed. Cloud computing encompasses various service models like Infrastructure as a Service (IaaS), Platform as a Service (PaaS), and Software as a Service (SaaS), allowing for cost-effective, scalable, and flexible computing capabilities while abstracting the complexities of underlying hardware and enabling ubiquitous, on-demand network access to a wide range of computing resources.

The term "container" as used herein refers, according to some embodiments, to a lightweight, standalone, and executable package of software that includes everything needed to run a piece of code, including code, libraries, dependencies, and settings. Containers may be isolated from each other and the host system, often making use of firewalls and/or encryption, and possibly sharing only a kernel, allowing multiple containers to run on a single host or server without conflicts. Containers enable efficient and portable deployment of applications across different cloud environments, without requiring changes to the underlying infrastructure, and facilitates scalable and reliable distribution of services and applications. A container may also be equivalently referred to as a "sandbox."

Embodiments of the present disclosure address the above identified problems using cloud infrastructures to offload demanding computational tasks to remote servers before streaming VR content to a user's client device (e.g., a headset).

Customers may be equivalently referred to herein as "users." Servers may also be equivalently referred to herein as "hosts." Applications may be equivalently referred to herein as "apps."

Some embodiments provide, as a technical solution to the technical problems described above, a framework that makes it possible for developers to have computationally expensive portions of VR experiences (e.g., rendering) hosted by third-party cloud providers, and to communicate with the light-duty services of a first-party VR provider in a way that protects user data with a similar level of protection to data on a head-mounted display (HMD), while also protecting revenue streams just as well as would a fully hosted solution. Some embodiments restrict access to sensitive data and activities to a connection directly between the headset and the services of the first-party VR provider.

FIG. 1 illustrates a network architecture 100 used to implement a cloud VR ecosystem, according to some embodiments. Architecture 100 may include servers 130 and a database 152, communicatively coupled with multiple client devices 110 via a network 150. Client devices 110 may include any one of a laptop computer, a desktop computer, or a mobile device such as a smart phone, a palm device, video player, or a tablet device. The database 152 may store backup files from, for example, matrices, videos, and processing data.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
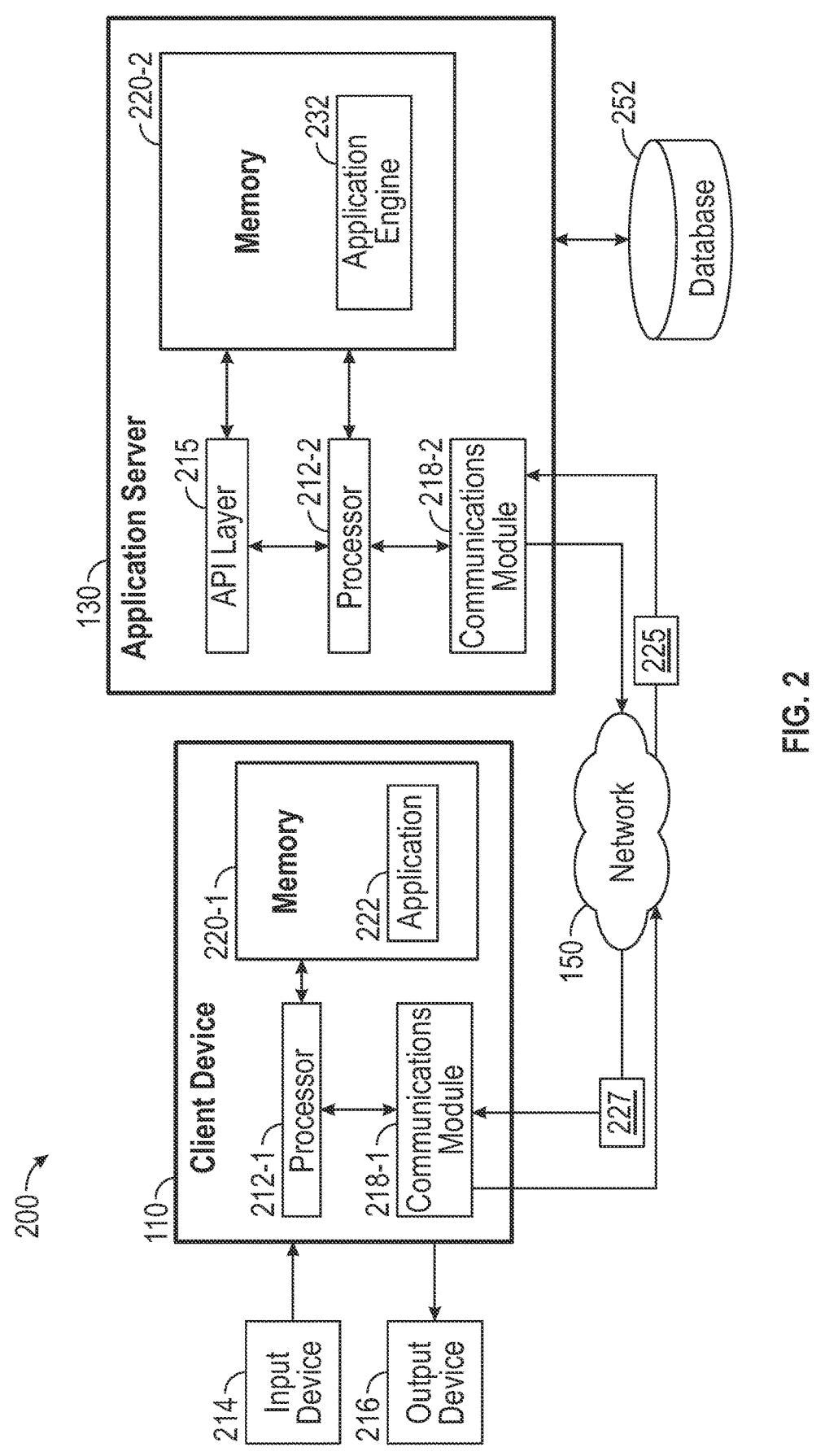
FIG. 2 is a block diagram illustrating details of devices used in the architecture of FIG. 1, according to some embodiments.

FIG. 2 is a block diagram illustrating details of a system 200 having at least one client device 110 and at least one server 130 used in a network architecture as disclosed herein (e.g., architecture 100), according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as requests, uploads, messages, and commands to other devices on the network 150. Communications modules 218 can be, for example, modems or Ethernet cards, and may include radio hardware and software for wireless communications (e.g., via electromagnetic radiation, such as radiofrequency -RF-, near field communications -NFC-, Wi-Fi, and Bluetooth radio technology). Client device 110 may be coupled with an input device 214 and with an output device 216. A user may interact with client device 110 via the input device 214 and the output device 216. Input device 214 may include a mouse, a keyboard, a pointer, a touchscreen, a microphone, a joystick, a virtual joystick, a touchscreen display that a user may use to interact with client device 110, or the like. In some embodiments, input device 214 may include cameras, microphones, and sensors, such as touch sensors, acoustic sensors, inertial motion units -IMUs- and other sensors configured to provide input data to a VR/AR headset. Output device 216 may be a screen display, a touchscreen, a speaker, and the like.

Client device 110 may also include a processor 212-1, configured to execute instructions stored in a memory 220-1, and to cause client device 110 to perform at least some operations in methods consistent with the present disclosure. Memory 220-1 may further include an application 222, configured to run in client device 110 and couple with input device 214 and output device 216. The application 222 may be downloaded by the user from server 130 and may be hosted by server 130. The application 222 includes specific instructions which, when executed by processor 212-1, cause operations to be performed according to methods described herein. In some embodiments, the application 222 runs on an operating system (OS) installed in client device 110. In some embodiments, application 222 may run out of a web browser. In some embodiments, the processor is configured to control a graphical user interface (GUI) for the user of one of client devices 110 accessing the server 130.

A database 252 may store data and files associated with the server 130 from the application 222. In some embodiments, client device 110 is a mobile phone used to collect a video or picture and upload to server 130 using a video or image collection application 222, to store in the database 252.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an application engine 232. The application engine 232 may be configured to perform operations and methods according to aspects of embodiments. The application engine 232 may share or provide features and resources with the client device, including multiple tools associated with data, image, or video collection, capture, or applications that use data, images, or video retrieved with application engine 232 (e.g., application 222). The user may access application engine 232 through application 222, installed in a memory 220-1 of client device 110. Accordingly, application 222 may be installed by server 130 and perform scripts and other routines provided by server 130 through any one of multiple tools. Execution of application 222 may be controlled by processor 212-1.

The system 200 may include multiple servers 130. For example, one such server may be a VR platform server of a first-party VR service provider, and another such server may be a cloud host of a third-party cloud service.

Shifting Costs to Certified VR Cloud Service Providers

Some embodiments disclosed herein enable a first-party VR provider to define the requirements a third-party cloud VR provider must comply with in order to participate in an ecosystem of the first-party VR provider. Doing so may facilitate customers having a good user experience when using their cloud VR streams.

Some embodiments make use of a certification process by the first-party VR provider, that may require third-party cloud VR providers to meet performance and concurrency requirements, along with security protocols that may mitigate the risks associated with having code that would otherwise be executed locally on a user's headset instead running remotely in a data center.

In some embodiments, the first-party VR provider may define requirements to run code in containers with strict firewall and file system limitations to ensure that user data is protected from unauthorized use. Additional security and certification requirements (e.g., those for data centers that provide Health Insurance Portability and Accountability Act (HIPAA) compliant services) may be defined to ensure the necessary security measures are in place to meet the first-party VR provider's obligations (e.g., legal, regulatory) to protect user data.

Figure 3:
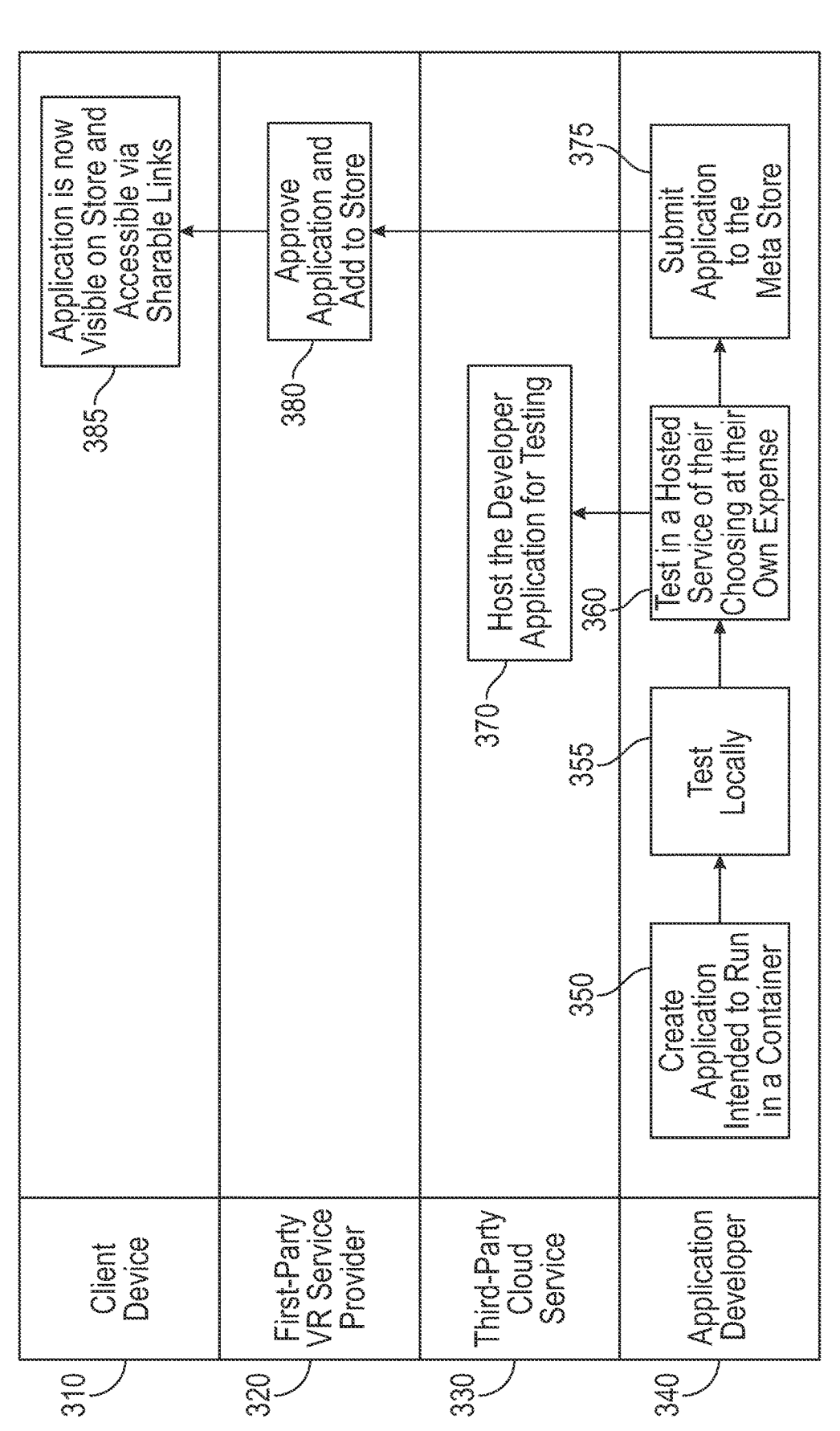
FIG. 3 illustrates a process for publishing an application to a cloud VR ecosystem, according to some embodiments.

FIG. 3 illustrates a system 300 executing a process 301 for publishing an application to a cloud VR ecosystem, according to some embodiments. The system 300 is similar to the embodiment of the system 200 discussed above with respect to FIG. 2, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In the system 300, data may be sent and received between a client device 310 (e.g., client device 110), a first-party VR service provider 320 (e.g., one or more servers such as server 130), a third-party cloud service 330 (e.g., one or more servers such as server 130), and an application developer 340. Various operations of the process 301 may be performed by different components of system 300, as described below.

At 350, the application developer 340 creates an application (e.g., a VR application) that is designed to run in a container. The application may include or communicate with a client-side component (e.g., a streaming client), such as the example of application 222 running within a portion of memory 220-1 on client device 310. The application may also include a server-side component (e.g., a cloud server), such as application engine 232 running within a portion of memory 220-2 of a host of the cloud service 330.

At 355, the application developer 340 tests the application locally, and at 360, tests the application in a hosted service of their choosing, at their own expense. Local testing may occur prior to hosted testing, or in parallel. The hosted service may be third-party cloud service 330, for example, operating multiple server hosts.

At 370, the third-party cloud service 330 receives the application from the application developer 340 and hosts the application.

At 375, upon completion of local and hosted testing, the application developer 340 submits the application to the first-party VR service provider 320. The submission process may include demonstrating compliance with certification, security, legal, and/or privacy requirements of the first-party VR service provider 320.

As an example, one of the requirements may be that the application, when executing on a host operated by the cloud service 330, be executed in a container on that host, the container being configured according to specifications provided by the VR service provider 320. These specifications may include firewall software that limits incoming and/or outgoing connections from the container to a pre-defined list of Internet Protocol (IP) addresses. These specifications may also include requiring end-to-end encryption of all data between the client device 310 and the host.

If the first-party VR service provider 320 verifies that the application meets the requirements, the application is (at 380) approved and added to the application store or library of the VR service. From the store (at 385) the application is now visible and accessible via shareable links. The application may be provided from the store to the client 310 upon request.

Protecting Sensitive Data

In some embodiments, the protocols used for communicating between the first-party VR provider's services, the user's equipment, and the third-party cloud VR service may be defined so that sensitive data and actions are performed entirely on the headset, through the use of system overlays and interfaces that know how to interact with the streamed VR experience. For example, logic on a server may indicate the user has chosen to make an in-app purchase (IAP). There may be a bespoke interface within the application, but the request to make the purchase may be relayed to the user's device, which may then present to the user a dialog box to get approval from the user for the purchase. The user may cancel the purchase, and the server may be notified. If the customer approves the purchase, the request may be sent from the device directly to the first-party VR provider's servers along with a token that may then be sent directly to the game server along with the results of the transaction. This model of performing sensitive activities on the headset, outside the reach of the third-party cloud VR provider, may be applied to any sensitive information not required for rendering.

In some embodiments, a third-party cloud VR server may need to have access to various forms of personally identifiable information (PII), including but not limited to motion tracker data and face/eye tracking data. This PII is information that VR applications may already have access to. Moving the logic that relies on PII to a cloud VR server may be safer than having headsets process it locally because the server instances may be firewalled and monitored. With a third-party cloud VR client running on a device controlled by a first-party VR provider, the risks of a third-party developer violating the first-party VR provider's terms of use may become much smaller because all communications may require explicit firewall permissions and may be auditable.

Figure 4:
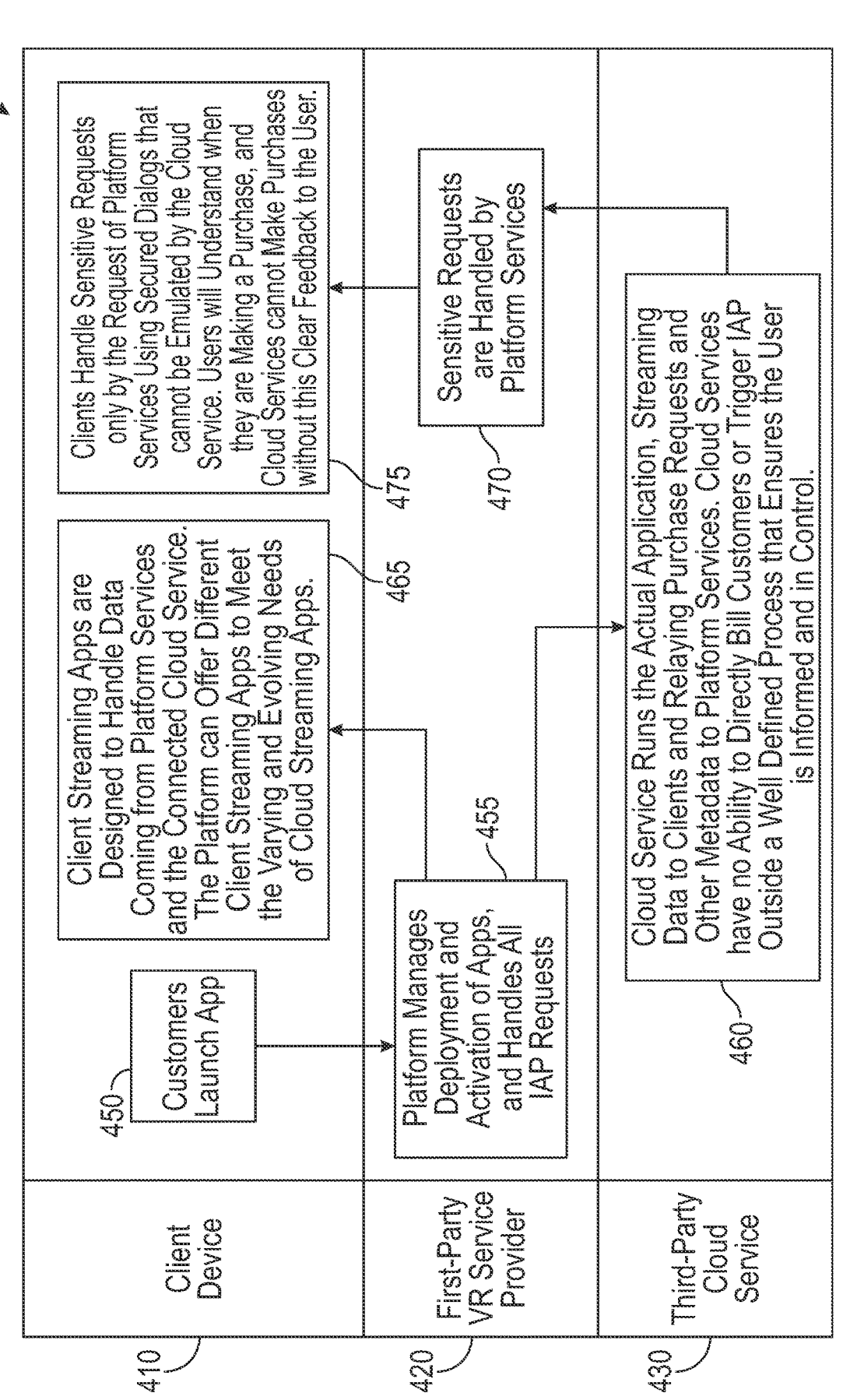
FIG. 4 illustrates a process for protecting sensitive data in a cloud VR ecosystem, according to some embodiments.

FIG. 4 illustrates a system 400 executing a process 401 for protecting sensitive data in a cloud VR ecosystem, according to some embodiments. The system 400 is similar to the embodiments of the system 200 and the system 300 discussed above with respect to FIG. 2 and FIG. 3, respectively, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In the system 400, data may be sent and received between a client device 410 (e.g., client device 110), a first-party VR platform service 420 (e.g., one or more servers such as server 130), and a third-party cloud service 430 (e.g., one or more servers such as server 130). Various operations of the process 401 may be performed by different components of system 400, as described below.

At 450, the customer launches an application on the client device 410. The application connects to the VR platform service 420 upon launch.

At 455, the VR platform service 420 manages the deployment and activation of applications, and handles all requests for sensitive data, including but not limited to in-app purchases (IAP). The VR platform 420 notifies the cloud service 430 that the application has been launched on the client device 410, and may provide minimal but sufficient metadata associated with the application and/or the customer, such as an IP address of the client device 410, a user identifier, and the like, for the cloud server 430 to establish a connection with the application and facilitate the user experience.

At 460, the cloud service 430 runs the actual application, streaming data to the client device 410 and relaying purchase requests and other metadata to VR platform services 420. In some embodiments, the actual application is executed within a container or sandbox. The cloud service 430 has no ability to directly bill customers or trigger IAP/sensitive data requests outside a well-defined process that ensures that the user is informed and in control.

At 465, the client device 410 executes a local streaming client, that is compatible with the application, and which is designed to handle data coming from both the VR platform service 420 and the connected cloud service 430. The VR platform service 420 may offer different client streaming applications to meet the varying and evolving needs of cloud streaming applications offered by different third-party cloud service providers and different generations or types of cloud streaming applications offered by any given cloud service provider.

At 470, the VR platform service 420 handles all requests for sensitive data, coming from the cloud service 430, and provides the requests to the client device 410.

At 475, the client device 410 handles sensitive requests only by the request of the VR platform service 420. In some embodiments, the client device 410 uses secure user input dialogs that cannot be emulated by the cloud service 430. In such a manner, users are able to clearly understand when they are making a purchase or otherwise disclosing sensitive information, and the cloud service cannot conduct a transaction without clear feedback to the user to inform them.

Maintaining a Curated, High Quality Customer Experience

In some embodiments, with cloud VR, a first-party VR provider may provide a quality of service (QOS) that meets customer expectations, by building the streaming client application and ensuring the application will connect only to approved experiences on certified hosts. The process for launching a streaming application on the device and connecting it to a VR host may provide this functionality.

In some embodiments, launching a cloud VR application from a client device may include some or all of the following operations:

1. The client may indicate they want to launch a cloud VR application by sending a request to the first-party VR provider's services, for example, through the first-party VR provider's VR shell or other entry point. The client may be software running on a customer headset that communicates with the first-party VR provider's services.

2. The first-party VR provider service may verify the client's request is valid by verifying the application is approved for use and by finding the appropriate host to launch the streaming application. These hosts may be operated by certified third-party cloud providers, paid for by the publishers, and registered with the first-party VR provider's service.

3. Once selected, the host may be notified of the request and either launch the application or deny the request. The request may include information where to download or access the application package.

4. The first-party VR provider may notify the client of the result. If the request is fulfilled, the client may receive the host connection data and the first-party VR provider session token.

5. The client may then use the provided connection data to launch the correct streaming client application and connect to the third-party host. There may be multiple versions of the client application as the system evolves because requiring developers to maintain functionality with the latest version may be impractical.

The solution of some embodiments may ensure that clients can only connect to trusted and authorized applications, and that the system will support legacy protocols to ensure applications do not have to be continually updated as the service matures. The result may be a secure environment that maintains the integrity of the first-party VR provider's business model because the first-party VR provider may be certain that all accessible applications have sufficient content curation and quality of service (QOS).

Securing the Revenue Stream

Some embodiments provide payment system integration. A compromised server or malicious application could bill users without their knowledge. The solution to this may be to require applications to use the first-party VR provider's streaming client(s) on the headset, ensuring that the application streams only to trusted services running on certified providers. One of the core responsibilities of the client may be to interface with the first-party VR provider's services for any activities that require extra protection. The hosted VR application (e.g., third-party-hosted app running developer code) may relay such operations through the first-party VR provider's services, which may validate them and forward them to the client as necessary.

An example of payment system integration according to some embodiments is now described.

1. When a user in a cloud VR application decides to purchase an IAP, the user may activate a "Buy" button (or equivalent) in whatever interface is available to trigger the purchase.

2. A message may be sent from the cloud VR host to the first-party VR provider's services, which then forwards the message to the headset with information (e.g., metadata) about the purchase request after performing any necessary filtering (e.g., parental controls or account issues).

3. The user may be presented with a system dialog box whereby they may approve or decline the purchase.

4. The response may be sent to the first-party VR provider's services, which may process the purchase as needed and notify the cloud VR host about the completed purchase (or the declined purchase).

In the above scenario, at no point, either through deliberate act of the developer or by way of a compromised server, may the user be at risk of an unauthorized purchase because the dialog box may be a system service communicating directly with the first-party VR provider's servers.

Although developers may put their own payment system in an application to bypass the first-party VR provider's payment system, the first-party VR provider may not approve the application for the first-party VR provider's ecosystem if it contains such a workaround.

Additionally, to evade the payment system integration, the third-party developers would have to circumvent the firewalls on the cloud servers. The first-party VR provider may disable applications discovered to be using alternative payment systems by simply blocking users and not sending the users to the applications' hosts.

Figure 5A:
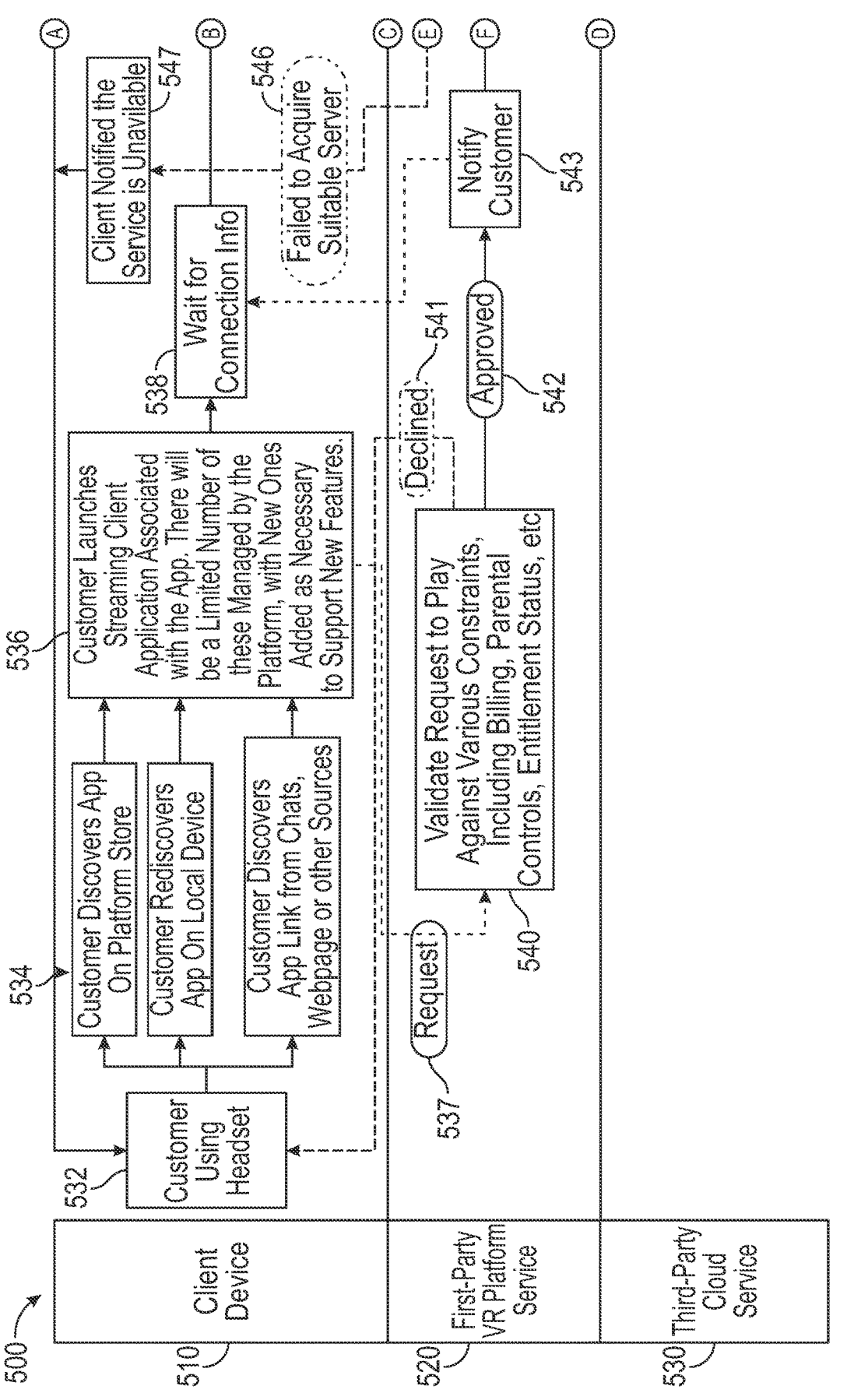
FIGS. 5A and 5B illustrate a process for launching a third-party cloud VR application on a VR platform service, according to some embodiments.
Figure 5A:
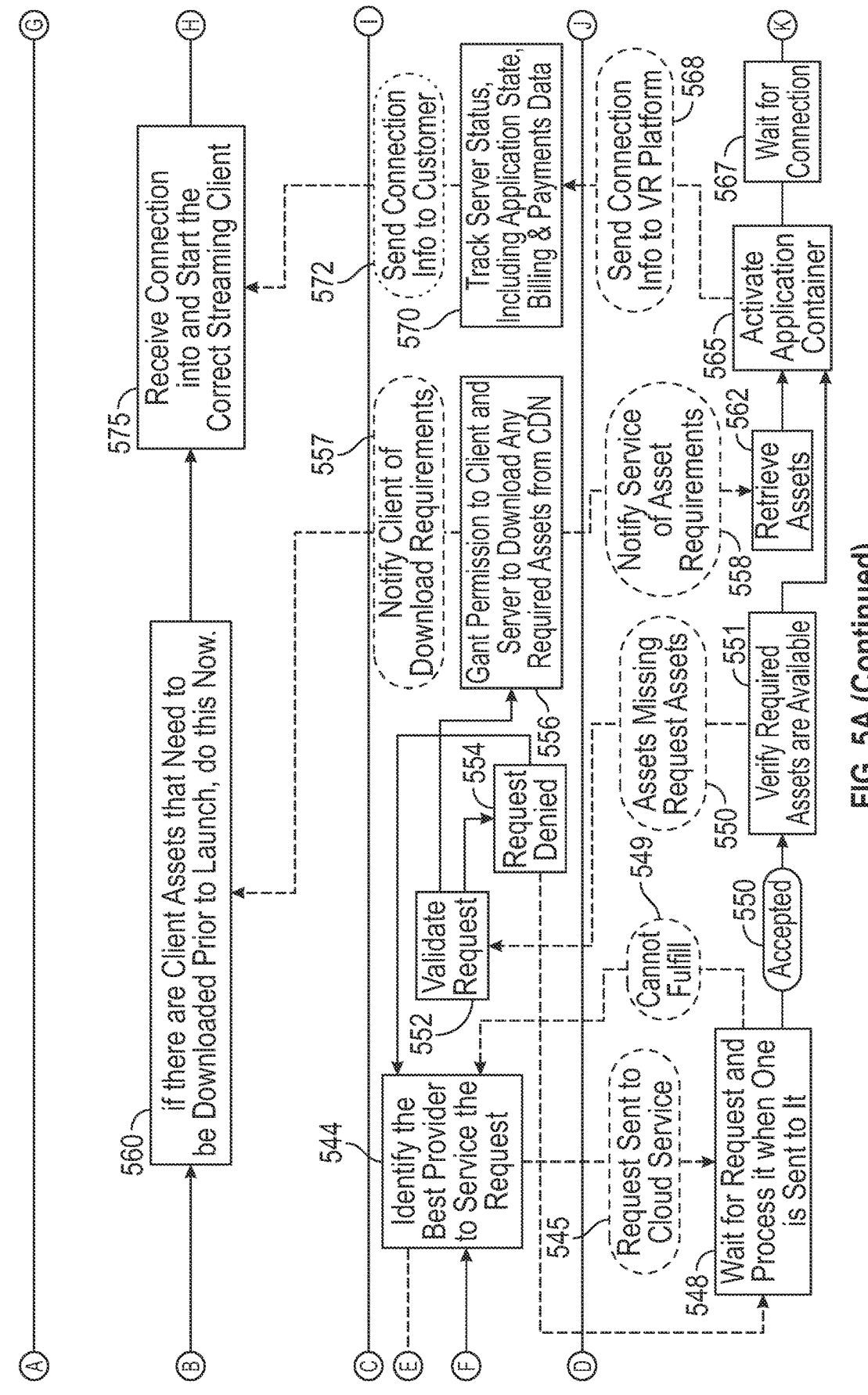
Figure 5B:
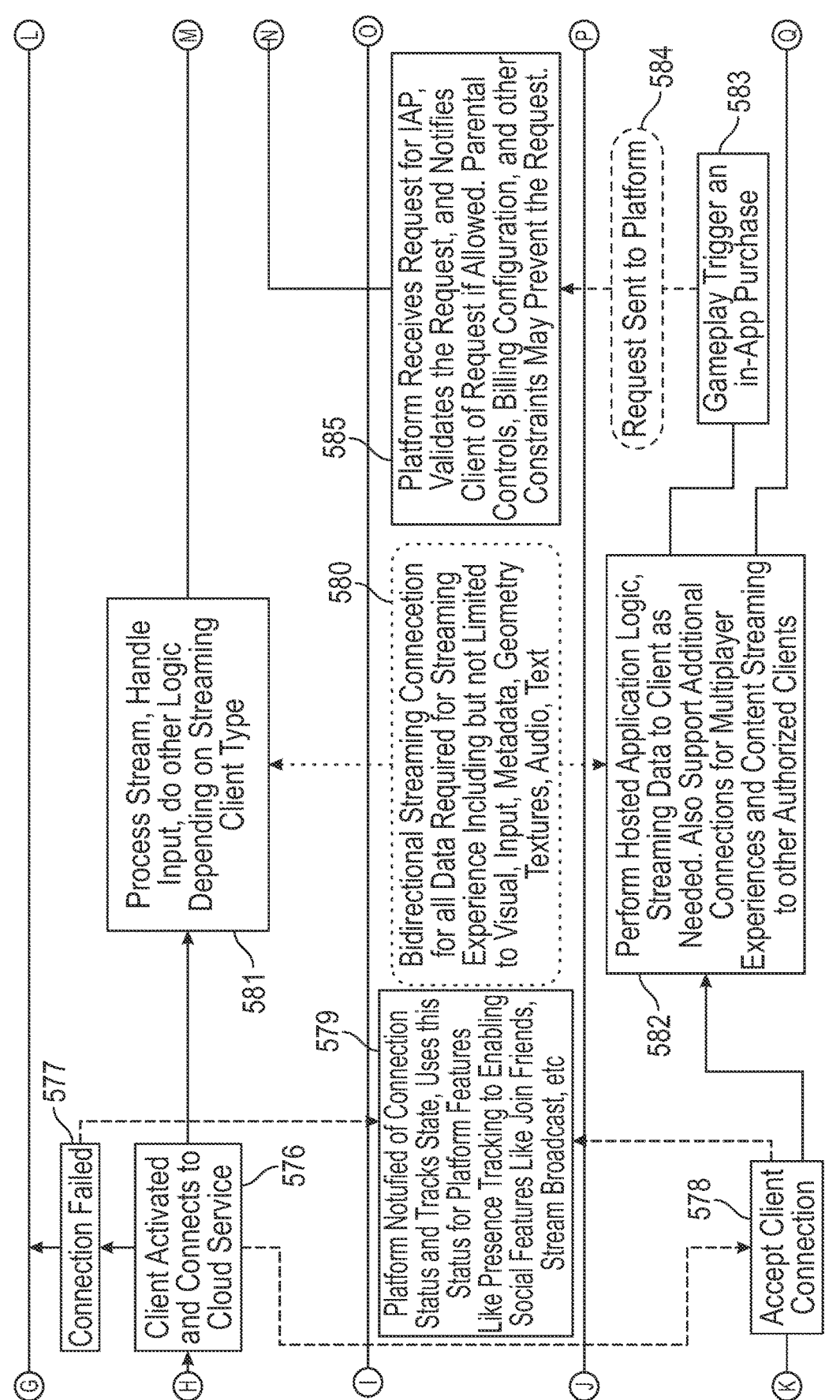
Figure 5B:
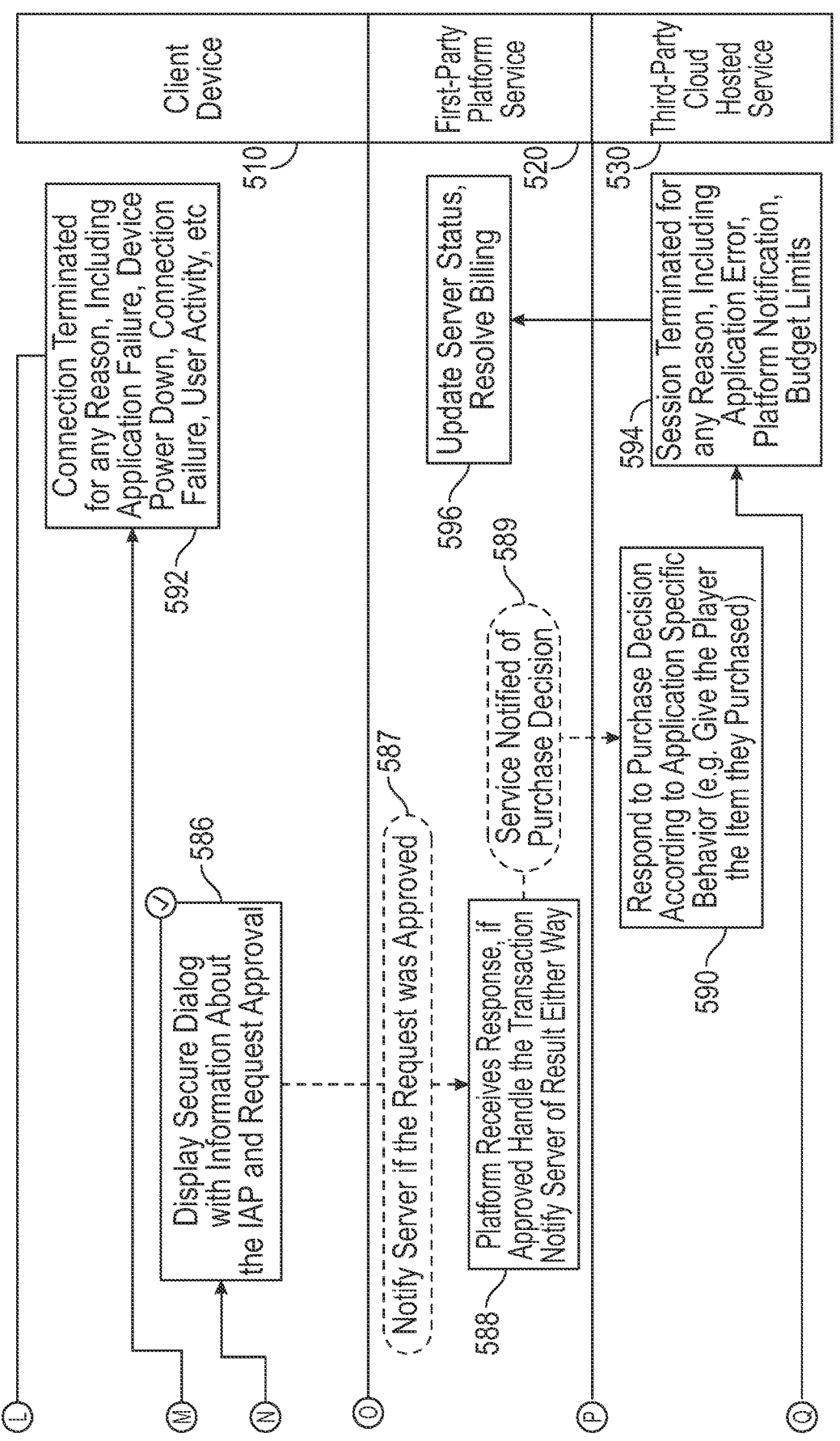

FIGS. 5A and 5B illustrate a system 500 executing a process 501 for launching a third-party cloud VR application on a VR platform service, according to some embodiments. The system 500 is similar to the embodiments of the system 200, the system 300, and the system 400 discussed above with respect to FIG. 2, FIG. 3, and FIG. 4, respectively, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In the system 500, data may be sent and received between a client device 510 (e.g., client device 110), a first-party VR platform service 520 (e.g., one or more servers such as server 130), and a third-party cloud service 530 (e.g., one or more servers such as server 130). Various operations of the process 501 may be performed by different components of system 500, as described below.

The third-party cloud VR application may include or communicate with a client-side component (e.g., a streaming client), such as the example of application 222 running within a portion of memory 220-1 on client device 510. The third-party cloud VR application may also include a server-side component (e.g., a cloud server), such as application engine 232 running within a portion of memory 220-2 of a host of the cloud service 530.

At 532, the user uses a client device 510 (e.g., a headset, a mobile phone, a computer, and the like) to access the VR platform service 520.

At 534, the user determines that they desire to launch a cloud app associated with the cloud service 530. The customer may come across this cloud app in any number of ways, including but not limited to discovering the cloud app on the VR platform's app store, rediscovering the cloud app on their client device 510, or discovering the cloud app via a link from a chat, a webpage, social media, or other sources.

At 536, the customer launches a streaming client app associated with the cloud app. In some embodiments, there may be a limited number of client apps managed by the platform, with new ones added as necessary to support new features. The streaming client sends a request 537 to the VR platform service 520 to launch the cloud app, and at 538 waits for connection information in response.

At 540, the VR platform service 520 validates the request 537 from the client device 510 against various constraints, including billing, parental controls, entitlement status, etc. Other factors used to validate the request 537 may include, but are not limited to, age requirements, whether a customer is restricted or banned, whether the customer has a subscription, or other policies that may control whether the user or the user's account is permitted or capable of launching the application.

If the VR platform service 520 determines that the client's request 537 is invalid, then at 541 the request 537 may be declined, and the process 501 may return to 532, which was described above.

If the VR platform service 520 determines that the client's request 537 is valid, then the request is approved at 542. The customer may be notified at 543, with a status update sent to the client device 510.

Upon approval, the VR platform service 520 identifies at 544 a cloud provider to service the request 537. In this example, the identified cloud provider is cloud service 530. In some embodiments the VR platform service 520 may scan a registry of cloud providers and/or available hosts and selects a host that is best for the customer. In other embodiments, the identified cloud service 530 may select the host. The VR platform service 520 sends a connection request 545 to the selected host.

In some embodiments, the host selection may be based on various factors, including but not limited to region (e.g., to minimize latency), restrictions by the developer (e.g., the cloud app should not be hosted or should not be available in a certain country or region), or region-specific mods (e.g., censorship of certain images or video according to local law, rule, or custom).

If the VR platform service 520 determines, at 546, that it has failed to identify a suitable cloud service 530 or host to service the request 537, then the client may be notified at 547 that the service is unavailable, in response to the initial request 537. The process 501 may return to 532, which was described above.

The request 545 is received by the cloud service 530 (for example, by a handler that waits for such requests and processes the requests as they are received). The cloud service 530 determines at 548 if it will fulfill or deny the request 545. The cloud service 530 may deny the request 545 for various reasons, such as the identified/selected host not having sufficient storage space, computing capacity, or other technological constraints. If the request 545 cannot be fulfilled, then a response 549 may be sent to the VR platform service 520. The process 501 may return to 544, which was described above, to select a different host and/or cloud service 530.

If the cloud service 530 is able to fulfill the request 545, then the request 545 is accepted at 550. In some embodiments the cloud service 530 determines at 551 if the required assets (also referred to as a package) for the cloud app are locally available on the selected host. If the assets are already locally available, then the cloud service 530 may fulfill the request 545 immediately, and the process 501 may proceed to 565, which is described below.

If the selected host does not have the assets available locally, the cloud service 530 may send a request 550 to the VR platform service 520 for authorization to acquire the missing assets.

The VR platform service 520, at 552, validates the request 550. In some embodiments, the request 550 is based on metadata associated with the request 550. If the metadata does not meet specified criteria, then the VR platform service 520 may at 554 deny the request 550. The process 501 may return to 544 and/or 548, which were described above.

If the metadata meets the criteria, or the VR platform service 520 validates the request 550 in another manner, then at 556 the VR platform service 520 grants permission to the client device 510 and the cloud service 530 to download any required assets (e.g., from a secure and previously defined location, a content distribution network, etc.). The client device 510 may be notified with asset download instructions 557, and the cloud service 530 may be notified with asset download instructions 558.

The client device 510 receives, at 560, the instructions 557, and determines whether there are any client assets that need to be downloaded prior to application launch. If so, the client device 510 acquires those assets. The location of those assets may be specified in the instructions 557. The process 501 may proceed to 575, which is described below.

The cloud service 530 receives the instructions 558, and at 562, retrieves the required assets. The location of those assets may be specified in the instructions 558.

The cloud service 530 activates, at 565, a container for the cloud app, and waits at 567 for a connection from the client device 510. The cloud service 530 further sends metadata 568 to the VR platform service 520, that includes the connection parameters that the client device 510 will need to connect to the selected host. In some embodiments, the metadata 568 may also include an authorization token that the client device 510 may need to authenticate the user to the cloud service 530.

The VR platform service 520 receives, at 570, the metadata 568, and uses the metadata 568 to generate instructions 572 that includes the connection parameters, which are provided to the client device 510. Instructions 572 may also include the authorization token, if present. In some embodiments, the VR platform service 520 also begins to track the host status, including cloud app state, as well as billing and payment data.

The client device 510, at 575, receives the instructions 572 that includes the connection parameters. Based on the instructions 572, the client device 510 launches the corresponding streaming client.

The client device 510, at 576, activates the streaming client and attempts to connect to the cloud service 530, using the connection parameters provided in instructions 572. If the client device 510 determines at 577 that the connection has failed, then the process 501 may return to 532, which was described above. If the connection succeeds, then the client device notifies the VR platform service 520. If the connection status changes, additional notifications may be provided to the VR platform service 520.

The cloud service 530 accepts, at 578, the incoming connection from the client device 510. The cloud service 530 also notifies the VR platform service 520 of the successful connection. If the connection status changes, additional notifications may be provided to the VR platform service 520.

The VR platform service 520 receives, at 579, notifications from the client device 510 and the cloud service 530, regarding the connection status and uses that information to keep track of the connection state. The VR platform service 520 may use the connection information for platform features, including but not limited to presence tracking, fulfilling transactions and payment, and enabling social features such as joining friends, stream broadcast, etc.

In some embodiments, the connection between the client device 510 and the cloud service 530 is a bidirectional streaming connection 580 that is used for all data required for the streaming experience, including but not limited to visual data, input data, metadata, geometry, textures, audio, and text. On the client side, the client device 510 (at 581) processes the stream, handles input, and performs other logic depending on the streaming client type. On the host side, the cloud service 530 (at 582) performs hosted application logic, streaming data to the client as needed, and also may support additional connections for multiplayer experiences and content streaming to other authorized clients.

In some embodiments, during the user interaction with the cloud app, actions by the user may result at 583 in a request 584 for sensitive data from the cloud service 530. As an example, the cloud app may be a game, and the sensitive data may be account information for an in-app purchase (IAP) event. The request 584 is sent to the VR platform service 520, not directly to the client device 510.

The VR platform service 520 receives, at 585, the request 584 and validates the request. If the request 584 is valid, then the VR platform service 520 provides the client device 510 with the request 584. If the request 584 is invalid, then the request 584 is denied. Various factors may prevent the request 584 or render it invalid, including but not limited to parental controls, billing configuration, and other constraints on the user or the user's account.

The client device 510 receives, at 586, the valid request 584 from the VR platform service 520. The client device 510 displays a secure dialog to the user, which includes information about the request 584 (e.g., the details of the IAP event that the user triggered as described above with respect to 583). If the user does not recognize the request 584 (i.e., it is a fraudulent request) or they change their mind about the IAP event, then the user may decline. Regardless of whether the user approves or denies the request 584, the client device 510 sends a corresponding notification 587 to the VR platform service 520 to notify of the user's decision.

The VR platform service 520 receives, at 588, the notification 587 indicating that the user has approved or denied the request 584. The VR platform service 520 sends a corresponding notification 589 to the cloud service 530 to notify of the user's decision.

The cloud service 530 receives, at 590, the notification 589 regarding the user's decision. If the decision was approved, then the cloud service 530 responds according to application-specific behavior and logic, accordingly. For example, if the cloud app is a video game and the request 584 was for an IAP event pertaining to an in-game item, then the cloud service 530 provides the in-game item to the user.

If (at 592) the bidirectional streaming connection 580 is terminated at the client device 510 for any reason (including but not limited to application failure, device power down, connection failure, user activity, etc.), the process 501 may return to 532, which was described above.

If (at 594) the bidirectional streaming connection 580 is terminated at the cloud service 530 for any reason (including but not limited to application error, platform notification, budget limits, etc.), the process 501 may proceed to 596, where the VR platform service 520 (which is tracking the connection state, as described above with respect to 579) updates the server status and resolves any billing associated with payments or purchases.

Figure 6:
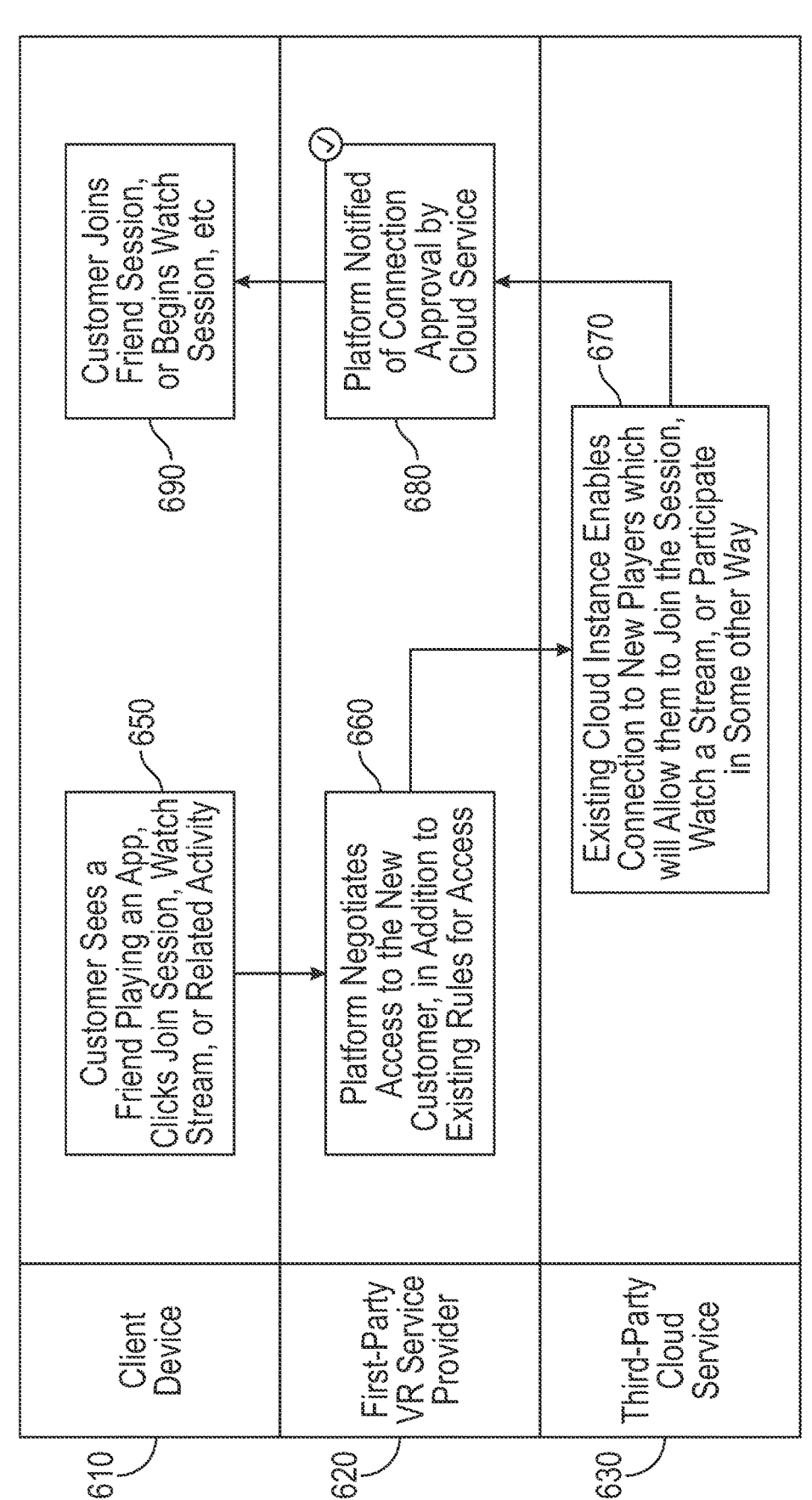
FIG. 6 illustrates a process for a customer to join a friend's activity in a cloud VR ecosystem, according to some embodiments.

FIG. 6 illustrates a system 600 executing a process 601 for a customer to join a friend's activity in a cloud VR ecosystem, according to some embodiments. The system 600 is similar to the embodiments of the system 200, system 300, system 400, and system 500 discussed above with respect to FIG. 2, FIG. 3, FIG. 4, and FIG. 5, respectively, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In system 600, data may be sent and received between a client device 610 (e.g., client device 110), a first-party VR platform service 620 (e.g., one or more servers such as server 130), a third-party cloud service 630 (e.g., one or more servers such as server 130), and an application developer 640. Various operations of the process 601 may be performed by different components of system 600, as described below.

At 650, on the client device 610, the customer sees a friend engaging in an activity within the VR environment. The activity may be using an application (e.g., a VR application), playing a game, conducting a live stream, or other activity. The customer may indicate their intention to join their friend and/or participate in that activity, by using an interface provided within the VR environment. For example, the customer may be provided an option to "join session," "watch stream," etc.

At 660, the VR platform service 620 negotiates with the cloud service 630, in response to the customer's indication, for access for the customer as a new user. This access may be in addition to existing rules for access. In some embodiments, the VR platform service 620 provides only the minimum information necessary for the customer to join the activity (e.g., a user identifier, and an IP address). In some embodiments, the cloud service 630 remains unaware of the social connection between the user and the friend, as the social network functionality is entirely handled by the VR platform service 620.

At 670, the cloud service 630 instructs the existing cloud instance to enable a connection for the new user, which will allow them to join their friend's session, watch their stream, or otherwise participate in their activity.

At 680, the VR platform service 620 is notified of the connection approval by the cloud service 630.

At 690, the customer joins their friend's activity on the client device 610.

Personal Information Concerns

Personal information may include, but is not limited to, motion controller data, individual participant data (IPD), and physical height. These are just some examples of data that is subject to data tracking on users. Access to this information may be necessary for a VR application to operate correctly. A first-party VR provider may rely on developer agreements and policies, as well as legal requirements, to prevent such information from being misused.

For example, in some embodiments, a first-party VR provider's privacy policy may list all the sources of data the first-party VR provider processes and how the first-party VR provider protects it, including how third parties may also collect information from a user directly through the experiences the third parties provide. The privacy policy may not state whether the processing of user data by an application occurs on a headset or in the cloud. Developers are obligated to protect this data to various degrees as required by law and their privacy policies regardless of whether their applications are running on the client device or a server. Shifting more of, if not most of, the processing of user data by an application from a device onto the cloud does not change these obligations.

In some embodiments, by hosting VR applications in a certified VR service provider, the first-party VR provider may increase the security of user data because it may be possible to limit network access to well-defined protocols and services, services that may become richer as the metaverse takes form and standards emerge for common activities. The end result may be a situation where user data may be at least as safe, if not safer, than when it is exposed to developer code on a headset. Hosting VR applications in the cloud may shift the risk to a different physical location where it could potentially benefit from increased oversight.

Paying for the Hosting Costs

In some embodiments, a first-party VR provider may design into the system a business model that keeps costs down and adapts to changes in costs in the marketplace. For example, the first-party VR provider may facilitate the connection and payment to hosts, simplifying the task of working with providers and delivering a system that "just works" for developers.

In some embodiments, the first-party developer may work with certified cloud VR providers to ensure there is a sufficient pool of services to meet the needs of all developers who may rely on these services for their applications. Some examples may allow for a bidding system where third-party cloud VR providers may adjust rates depending on load, availability, or other reasons, and the first-party VR provider may direct customers to the provider with the best rates. The first-party VR provider may capture a portion of that revenue.

Third-party developers may put cloud VR hosting fees into their budget just like any other project costs. If, for example, a VR gaming title has no budget for cloud services, then they would not be able to activate any VR streams. It could be that purchasing a title with 10 total hours of play time over for each user on average would allocate the necessary portion of the sales to cover 10 hours of cloud service fees. In this case, the first-party VR provider may in some embodiments provide a means for users to pay for the cloud service directly through an in-app purchase mechanism, where the fees are used to pay for the cloud service. This may ensure unmaintained apps that users have purchased are still playable in the event the publisher is no longer available. A more complete system may provide support for minimum hours per user per title, with a user-friendly process for a user to get more server time if they go outside the budgeted amount.

According to a system of some embodiments, instead of users paying a flat fee for access, each developer may be responsible for their own server usage, selected from an open marketplace of certified providers competing with each other. The end result may be a system where the first-party VR provider does not shoulder the entire risk of building and operating a cloud VR ecosystem on their own. The first-party VR provider's role may be that of an intermediary, ensuring the system is operational and providing the underlying services that developers and customers can rely on. Building the framework may keep the first-party VR provider out of the business of maintaining the data centers while at the same time providing the first-party VR provider with opportunities to earn part of the revenue stream that flows through it.

FIG. 7 is a flowchart illustrating a process 700 performed by a first-party VR platform service (e.g., servers 130, first-party VR service provider 320, first-party VR platform service 420, first-party VR platform service 520, first-party VR platform service 620, and the like) for virtual reality cloud computing, according to some embodiments. In some embodiments, one or more operations in process 700 may be performed by a processor circuit (e.g., processors 212, etc.) executing instructions stored in a memory circuit (e.g., memories 220, etc.) of a system (e.g., system 200, system 300, system 400, system 500, system 600, and the like) as disclosed herein. Moreover, in some embodiments, a process consistent with this disclosure may include at least operations in process 700 performed in a different order, simultaneously, quasi-simultaneously, or overlapping in time.

At 710, the process 700 receives, from a client device, a request by a user of the client device to execute an application, the application being provided by a third-party cloud service having one or more hosts.

At 720, the process 700 selects, from the hosts, a particular host to service the request.

At 730, the process 700 receives, from the particular host, connection parameters that are required for establishing a streaming connection to the particular host.

At 740, the process 700 provides, in response to the request, the connection parameters to a streaming client executing on the client device.

At 750, the process 700 instructs the streaming client to establish the streaming connection to the particular host and to execute the application.

In some embodiments, the particular host requests to acquire software assets required to execute the application. Based on a determination that the software assets meet certification criteria, the process 700 authorizes the particular host to retrieve the software assets. Based on a further determination that the streaming client requires additional software assets to execute the application, the process 700 further instructs the streaming client to retrieve the additional software assets.

In some embodiments, the process 700 further provides to the streaming client, a shared virtual environment and metadata associated with the user, the metadata including a list of friends of the user who are currently also within the shared virtual environment. In some such embodiments, the process 700 receives from a particular friend of the user within the shared virtual environment, a request to participate in an activity being performed by the user through the streaming client. The process 700 further provides, to the particular host, metadata associated with the particular friend, provides the connection parameters to a second streaming client executing on a second client device being used by the particular friend, and instructs the second streaming client to establish the streaming connection to the particular host and to execute the application.

FIG. 8 is a flowchart illustrating a process 800 performed by a first-party VR platform service (e.g., servers 130, first-party VR service provider 320, first-party VR platform service 420, first-party VR platform service 520, first-party VR platform service 620, and the like) for processing in-application transactions, according to some embodiments. In some embodiments, one or more operations in process 800 may be performed by a processor circuit (e.g., processors 212, etc.) executing instructions stored in a memory circuit (e.g., memories 220, etc.) of a system (e.g., system 200, system 300, system 400, system 500, system 600, and the like) as disclosed herein. Moreover, in some embodiments, a process consistent with this disclosure may include at least operations in process 800 performed in a different order, simultaneously, quasi-simultaneously, or overlapping in time.

At 810, the process 800 receives, from a particular host of a third-party cloud service, a request for a transaction, the transaction being a payment by a user in exchange for a product. In some embodiments, the transaction is an in-application purchase, and the product is at least one of additional content and services within the application.

At 820, the process 800 requests, from a streaming client used by the user on a client device, an authorization to conduct the transaction.

At 830, the process 800 receives, as a response from the streaming client, the authorization to conduct the transaction.

At 840, the process 800 receives, in response to the request, a payment from the user.

At 850, further in response to the request, the process 800 instructs the particular host to provide the product to the user through the streaming client on the client device.

Alternatively, if at 830, the process 800 does not receive authorization to conduct the transaction, the process 800 denies the request from the particular host.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously.

In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user. Method claims may be provided to present elements of the various steps, operations, or processes in a sample order, and are not meant to be limited to the specific order or hierarchy presented.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A method for virtual reality cloud computing, comprising:
   receiving, from a client device, a first request by a user of the client device to execute an application, the application being provided by a third-party cloud service comprising a plurality of hosts;
   selecting, from the plurality of hosts, a particular host to service the first request;
   receiving, from the particular host, connection parameters that are required for establishing a streaming connection to the particular host;
   in response to the first request, providing the connection parameters to a streaming client executing on the client device;
   instructing the streaming client to establish the streaming connection to the particular host and to execute the application;
   receiving, from the particular host, a second request for a transaction, the transaction comprising a payment in exchange for a product;
   requesting, from the streaming client, an authorization to conduct the transaction;
   receiving, as a response from the streaming client, a denial of the authorization to conduct the transaction; and
   in response to the second request, notifying the particular host that the transaction was denied.

2. The method of claim 1, wherein the transaction is a first transaction, the method further comprising:
   receiving, from the particular host, a third request for a second transaction;
   requesting, from the streaming client, an authorization to conduct the second transaction;
   receiving, as a response from the streaming client, the authorization to conduct the second transaction;
   in response to the third request, receiving funds; and
   further in response to the third request, instructing the particular host to complete the second transaction.

3. The method of claim 1, wherein the transaction is an in-application purchase, and the product is at least one of additional content and services within the application.

4. The method of claim 1 further comprising:

receiving, from the particular host, a third request to acquire software assets required to execute the application; and based on a determination that the software assets meet certification criteria, authorizing the particular host to retrieve the software assets.

5. The method of claim 4, wherein the determination is a first determination, the method further comprising:

based on the first determination and further based on a second determination that the streaming client requires additional software assets to execute the application, instructing the streaming client to retrieve the additional software assets.

6. The method of claim 1, further comprising providing to the streaming client, a shared virtual environment and metadata associated with the user, the metadata comprising a list of friends of the user who are currently also within the shared virtual environment.

7. The method of claim 6, wherein the client device is a first client device and the streaming client is a second streaming client, the method further comprising:

receiving, from a particular friend of the user within the shared virtual environment, a request to participate in an activity being performed by the user through the streaming client;

providing, to the particular host, metadata associated with the particular friend;

providing the connection parameters to a second streaming client executing on a second client device being used by the particular friend; and instructing the second streaming client to establish the streaming connection to the particular host and to execute the application.

8. A non-transitory computer-readable medium storing a program, for virtual reality cloud computing, which when executed by a computer, configures the computer to:

receive, from a client device, a first request by a user of the client device to execute an application, the application being provided by a third-party cloud service comprising a plurality of hosts;

select, from the plurality of hosts, a particular host to service the first request;

receive, from the particular host, connection parameters that are required for establishing a streaming connection to the particular host;

in response to the first request, provide the connection parameters to a streaming client executing on the client device;

instruct the streaming client to establish the streaming connection to the particular host and to execute the application;

receive, from the particular host, a second request for a transaction, the transaction comprising a payment in exchange for a product;

request, from the streaming client, an authorization to conduct the transaction;

receive, as a response from the streaming client, a denial of the authorization to conduct the transaction; and in response to the second request, notify the particular host that the transaction was denied.

9. The non-transitory computer-readable medium of claim 8, wherein the transaction is a first transaction, and the program, when executed by the computer, further configures the computer to:

receive, from the particular host, a third request for a second transaction;

request, from the streaming client, an authorization to conduct the second transaction;

receive, as a response from the streaming client, the authorization to conduct the second transaction;

in response to the third request, receive funds; and further in response to the third request, instruct the particular host to complete the second transaction.

10. The non-transitory computer-readable medium of claim 8, wherein the transaction is an in-application purchase, and the product is at least one of additional content and services within the application.

11. The non-transitory computer-readable medium of claim 8, wherein the program, when executed by the computer, further configures the computer to:

receive, from the particular host, a third request to acquire software assets required to execute the application; and based on a determination that the software assets meet certification criteria, authorize the particular host to retrieve the software assets.

12. The non-transitory computer-readable medium of claim 11, wherein the determination is a first determination, and the program, when executed by the computer, further configure the computer to:

based on the first determination and further based on a second determination that the streaming client requires additional software assets to execute the application, instruct the streaming client to retrieve the additional software assets.

13. The non-transitory computer-readable medium of claim 8, wherein the program, when executed by the computer, further configures the computer to:

provide to the streaming client, a shared virtual environment and metadata associated with the user, the metadata comprising a list of friends of the user who are currently also within the shared virtual environment.

14. The non-transitory computer-readable medium of claim 13, wherein the client device is a first client device and the streaming client is a second streaming client, and the program, when executed by the computer, further configures the computer to:

receive, from a particular friend of the user within the shared virtual environment, a request to participate in an activity being performed by the user through the streaming client;

provide, to the particular host, metadata associated with the particular friend;

provide the connection parameters to a second streaming client executing on a second client device being used by the particular friend; and instruct the second streaming client to establish the streaming connection to the particular host and to execute the application.

15. A system for virtual reality cloud computing, comprising:

one or more processors; and a non-transitory computer readable medium storing a set of instructions, which when executed by the one or more processors, cause the system to:

receive, from a client device, a first request by a user of the client device to execute an application, the application being provided by a third-party cloud service comprising a plurality of hosts;

select, from the plurality of hosts, a particular host to service the first request;

receive, from the particular host, connection parameters that are required for establishing a streaming connection to the particular host;

in response to the first request, provide the connection parameters to a streaming client executing on the client device;

instruct the streaming client to establish the streaming connection to the particular host and to execute the application;

receive, from the particular host, a second request for a transaction, the transaction comprising a payment in exchange for a product;

request, from the streaming client, an authorization to conduct the transaction;

receive, as a response from the streaming client, a denial of the authorization to conduct the transaction; and in response to the second request, notify the particular host that the transaction was denied.

16. The system of claim 15, wherein the transaction is a first transaction and the instructions, when executed by the one or more processors, further cause the system to:

receive, from the particular host, a third request for a second transaction;

request, from the streaming client, an authorization to conduct the second transaction;

receive, as a response from the streaming client, the authorization to conduct the second transaction;

in response to the third request, receive funds; and further in response to the third request, instruct the particular host to complete the second transaction.

17. The system of claim 15, wherein the instructions, when executed by the one or more processors, further cause the system to:

receive, from the particular host, a third request to acquire software assets required to execute the application;

based on a first determination that the software assets meet certification criteria, authorize the particular host to retrieve the software assets; and based on the first determination and further based on a second determination that the streaming client requires additional software assets to execute the application, instruct the streaming client to retrieve the additional software assets.

18. The system of claim 15, wherein the client device is a first client device and the streaming client is a second streaming client, and the instructions, when executed by the one or more processors, further cause the system to:

provide to the streaming client, a shared virtual environment and metadata associated with the user, the metadata comprising a list of friends of the user who are currently also within the shared virtual environment;

receive, from a particular friend of the user within the shared virtual environment, a request to participate in an activity being performed by the user through the streaming client;

provide, to the particular host, metadata associated with the particular friend;

provide the connection parameters to a second streaming client executing on a second client device being used by the particular friend; and instruct the second streaming client to establish the streaming connection to the particular host and to execute the application.

* * * * *